US006665860B1

(12) United States Patent
DeSantis et al.

(10) Patent No.: US 6,665,860 B1
(45) Date of Patent: Dec. 16, 2003

(54) SEVER-BASED METHOD AND APPARATUS FOR ENABLING CLIENT SYSTEMS ON A NETWORK TO PRESENT RESULTS OF SOFTWARE EXECUTION IN ANY OF MULTIPLE SELECTABLE RENDER MODES

(75) Inventors: Robert P. DeSantis, San Jose, CA (US); Julio M. Santos, Sunnyvale, CA (US)

(73) Assignee: AlphaBlox Corporation, Mountain View, CA (US)

( * ) Notice: Subject to any disclaimer, the term of this patent is extended or adjusted under 35 U.S.C. 154(b) by 0 days.

(21) Appl. No.: 09/484,188

(22) Filed: Jan. 18, 2000

(51) Int. Cl.[7] .................................................. G06F 9/44
(52) U.S. Cl. ...................... 717/115; 717/112; 717/113; 715/513
(58) Field of Search .................. 717/110–113, 120–121, 717/123; 707/513–514; 715/513–514

(56) References Cited

U.S. PATENT DOCUMENTS 6,370,537 B1 * 4/2002 Gilbert et al. ............... 707/101

OTHER PUBLICATIONS

Florescu et al., Database Techniques for the World–Wide Web: A survey, CiteSeer Scientific Literature Digital Library, http://citeseer.nj.nec.com, pp. 1–14, 1998.*

Bosak, "XML, Java, and the future of the Web", Sun Microsystems, pp. 1–11, 1997.*

Choudhury et al., "Copyright protection for electronic publishing over computer networks", IEEE, pp. 12–20, Jun. 1995.*

* cited by examiner

Primary Examiner—Tuan Dam
Assistant Examiner—Ted T. Vo
(74) Attorney, Agent, or Firm—Fenwick & West LLP

(57) ABSTRACT

A method and apparatus for enabling software to be executed in any of a plurality of render modes are provided. A set of hypermedia pages and associated executable components maintained in a server system collectively form logic definition of a software application. The server maintains a number of render modules, each corresponding to a different one of multiple render modes. Each of the render modes is for use with the same logic definition of the software application. In the server system, one of the render modes is selected based on, and in response to, a signal from a remote client system representing a user-initiated request to execute the software application. The signal represents a Uniform Resource Locator (URL) that includes a render parameter specifying a render mode. The server uses the logic definition of the software application and an appropriate one of the render modules to provide information to the client system, to enable the client system to present the software application to the user in the selected render mode.

21 Claims, 5 Drawing Sheets

SEVER-BASED METHOD AND APPARATUS FOR ENABLING CLIENT SYSTEMS ON A NETWORK TO PRESENT RESULTS OF SOFTWARE EXECUTION IN ANY OF MULTIPLE SELECTABLE RENDER MODES

FIELD OF THE INVENTION

The present invention pertains to execution of software applications in a distributed network environment. More particularly, the present invention relates to using a server system to provide multiple, selectable rendering modes of a given software application, for use by client systems on a network.

BACKGROUND OF THE INVENTION

Significant attention has been focused recently on developing software applications for use in distributed network environments, such as the Internet. In particular, there has been great interest in enabling the user of client system to access and execute a software application that resides on a remote server on the Internet. Technology currently exists to allow such a software application to be constructed as a set of hypertext markup language (HTML) pages with an associated set of executable components, such as Java applets. These applets may be used, for example, to perform functions such as generating grids, charts, and tables, which appear within an HTML page when displayed by a web browser. While such applications are now commonly available, they have various shortcomings.

Because the Internet is not a homogeneous network, the many computer systems and other machines which form the Internet have a variety of different hardware and software configurations. As a result, these machines have widely varying capabilities. These capabilities may determine, among other things, how a particular client system on Internet can present a software application to the user. That is, different client systems on Internet may have different rendering capabilities. For example, some client systems may be capable of rendering output of a software application by executing Java applets, while others may not. Some client machines may be capable of rendering a software application using interactive HTML, while others may not. Various other differences in capabilities may also be encountered.

To accommodate such differences, developers of Internet applications have resorted to writing separate versions of a given software application for each different type of client rendering capability the software application is expected to support. This process tends to be time-consuming and labor-intensive and can therefore add to the cost of developing and using software.

SUMMARY OF THE INVENTION

The present invention includes a method and apparatus for enabling software to be presented in any of a plurality of render modes. A logic definition of any software application is maintained in a server system on a network. The logic definition is for use with each of multiple selectable render modes for presenting the software application on a client system on the network. In the server system, one of a plurality of render modes is selected based on, and in response to, a signal from the client system, and the logic definition of the software application is used to cause the output of the software to be rendered to the client system in the selected render mode.

In certain embodiments, the server maintains a number of render modules, each corresponding to a different one of the render modes. The signal from the client may be a user-initiated request to execute the software application and may include a render parameter for specifying the render mode.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for enabling software to be executed in any of a plurality of render modes in a client system on a network. As will be described in greater detail below, a set of hypermedia pages and associated executable components maintained in a server system on the network collectively form logic definition of a software application, which can be essentially any type of software application. The server maintains a number of render modules, each corresponding to a different one of multiple render modes. Each of the render modules is for use with the same application definition of the software application. In the server system, one of the render modules is selected based on, and in response to, a signal from the client system. The signal representing a user-initiated request to execute the software application. The signal represents a Uniform Resource Locator (URL) that may include a render parameter specifying a render mode. The server uses the logic definition of the software application and an appropriate one of the render modules to provide information to the client system, to enable the client system to present the software application to the user in the selected render mode. Importantly, the same application definition is used for all of the multiple render modes.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

As will be apparent from this description, the present invention may be embodied, at least in part, as software, or as a result of executing software. That is, sequences of instructions contained in memory can be executed to cause a computer's microprocessor to perform or initiate the operations described herein. It is understood that such instructions may be loaded into the computer's memory from a persistent store, such as a mass storage device, and/or from one or more of the other computer systems over a network, such as the Internet.

Figure 1:
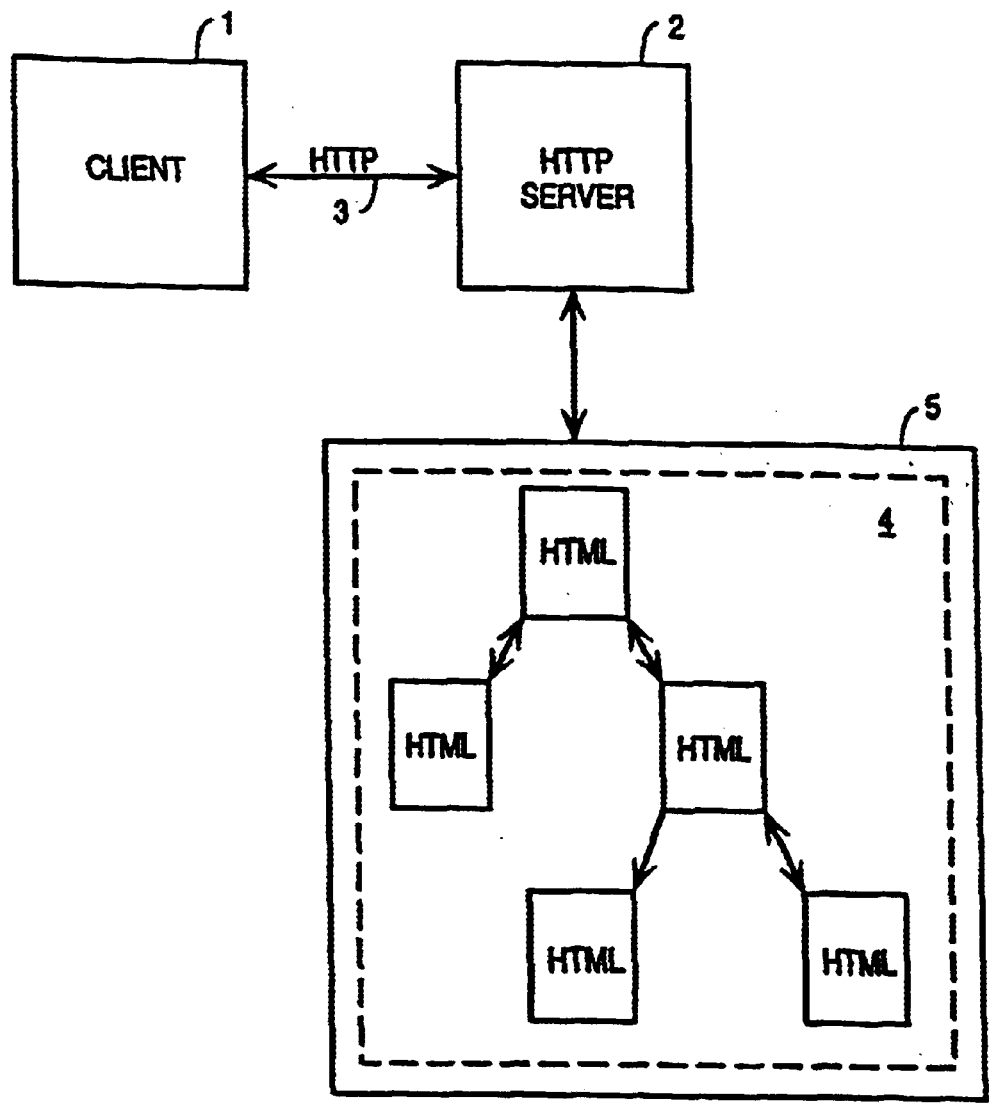
FIG. 1 illustrates a network arrangement by which a server system provides a client system with access to hypermedia pages.

FIG. 1 illustrates a conventional network arrangement by which a user can browse the World Wide Web ("the Web") on the Internet. A client computer system 1 has a connection 3 via the Internet to a server computer system 2. The client system 1 executes browser software which, in response to a user command, sends a request for a hypermedia based page, such as an HTML page, to the server 2 using, for example, Hypertext Transport Protocol (HTTP). The requested HTML page is one of a number of HTML pages 4 that are stored in a storage facility 5. The storage facility 5 may or may not be physically located on the same computer system as the server 2. The HTML pages 4 are functionally interconnected by various hypermedia (e.g., hypertext) links and may be logically arranged in a tree hierarchy, as shown. In response to the browser's request, the server 2 retrieves the requested page and provides it to the client 1, which then displays the page to the user.

Figure 2:
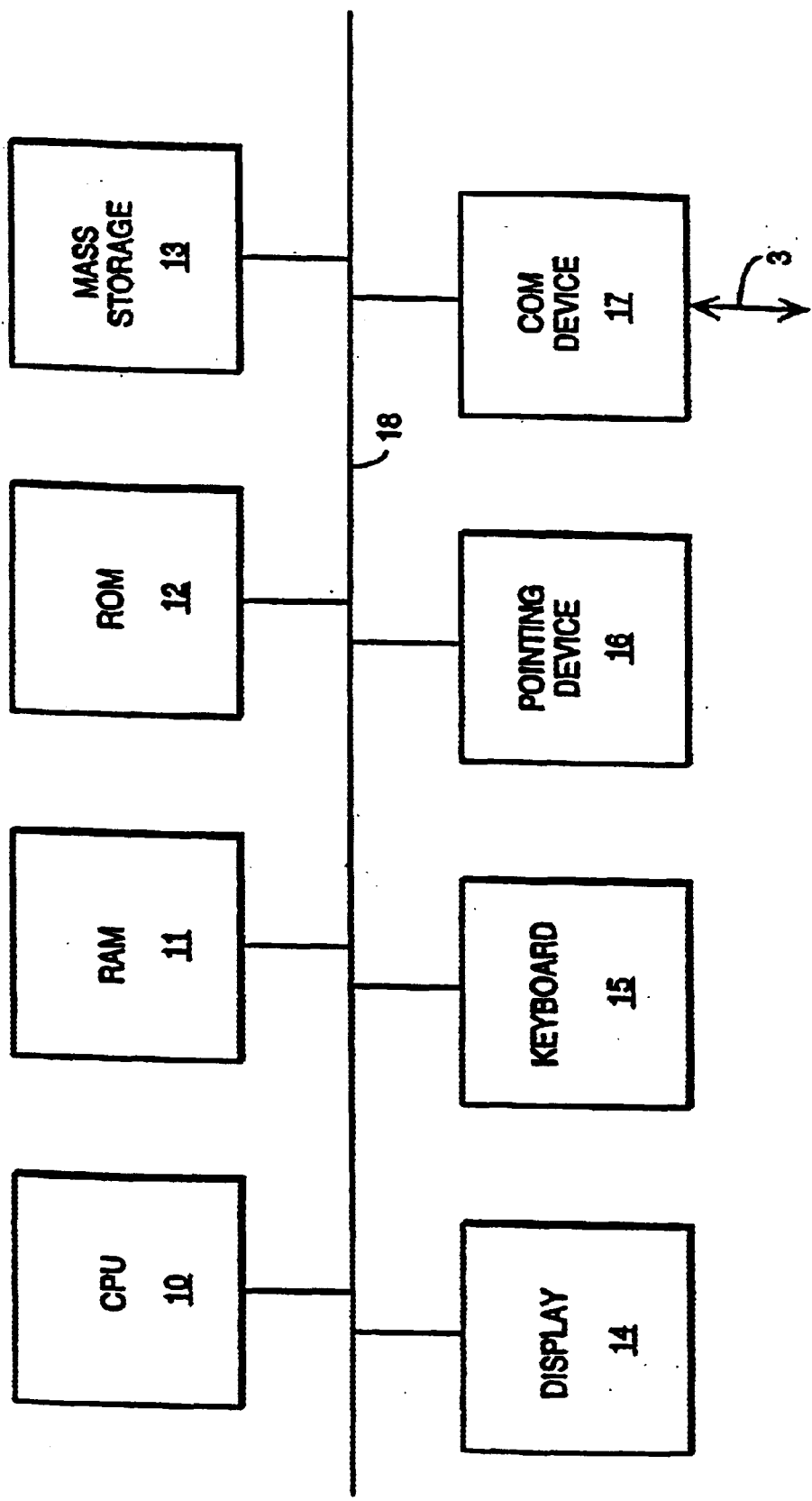
FIG. 2 is a block diagram of a computer system that may represent a server system or a client system such as described herein.

FIG. 2 is a simplified block diagram of the architecture of a computer system that may be representative of the client 1, the server 2, or any other computer system mentioned in this description. The computer system may be, for example, a conventional personal computer (PC), a workstation, or a hand-held device such as a personal digital assistant (PDA), personal information manager (PIM), cellular/wireless communication device, etc. The illustrated computer system includes a central processing unit (CPU) 10, which is a microprocessor, random access memory (RAM) 11, read-only memory (ROM) 12, and a mass storage device 13, all coupled to a bus system 18. The bus system 18 may actually include one or more physical buses interconnected by one or more adapters, bridges and/or controllers. For example, the bus system may include a system bus connected to the CPU 10 and one or more peripheral buses, such as a Peripheral Component Interconnect (PCI) bus.

Also connected to the bus system 18 are a display device 14, a keyboard 15, a pointing device 16, and a communication device 17. The communication device 17 provides an interface between the illustrated computer system and the network connection 3 for purposes of communicating with other computer systems.

The communication device 17 may be any suitable device for allowing the computer system to communicate with a remote computer system communicating over a network connection 3, such as an Ethernet adapter, a conventional telephone modem, a cable modem, an Integrated Services Digital Network (ISDN) adapter, a Digital Subscriber Line (xDSL) adapter, or any other suitable device. The mass storage device 13 may be or may include any suitable non-volatile medium for storing large amounts of data, such as a magnetic disk or tape, a magneto-optical (MO) storage device, any variation of Digital Versatile Disk (DVD) or Compact Disk (CD), flash memory, or the like. The pointing device 16 may be any suitable device for allowing a user to position a pointer displayed on the display device 14, such as a mouse, trackball, touchpad, joystick, or the like.

Of course, numerous variations upon the illustrated system are possible. That is components may be added to the system or omitted from the system, as desirable for a particular application or manner of use.

Figure 3:
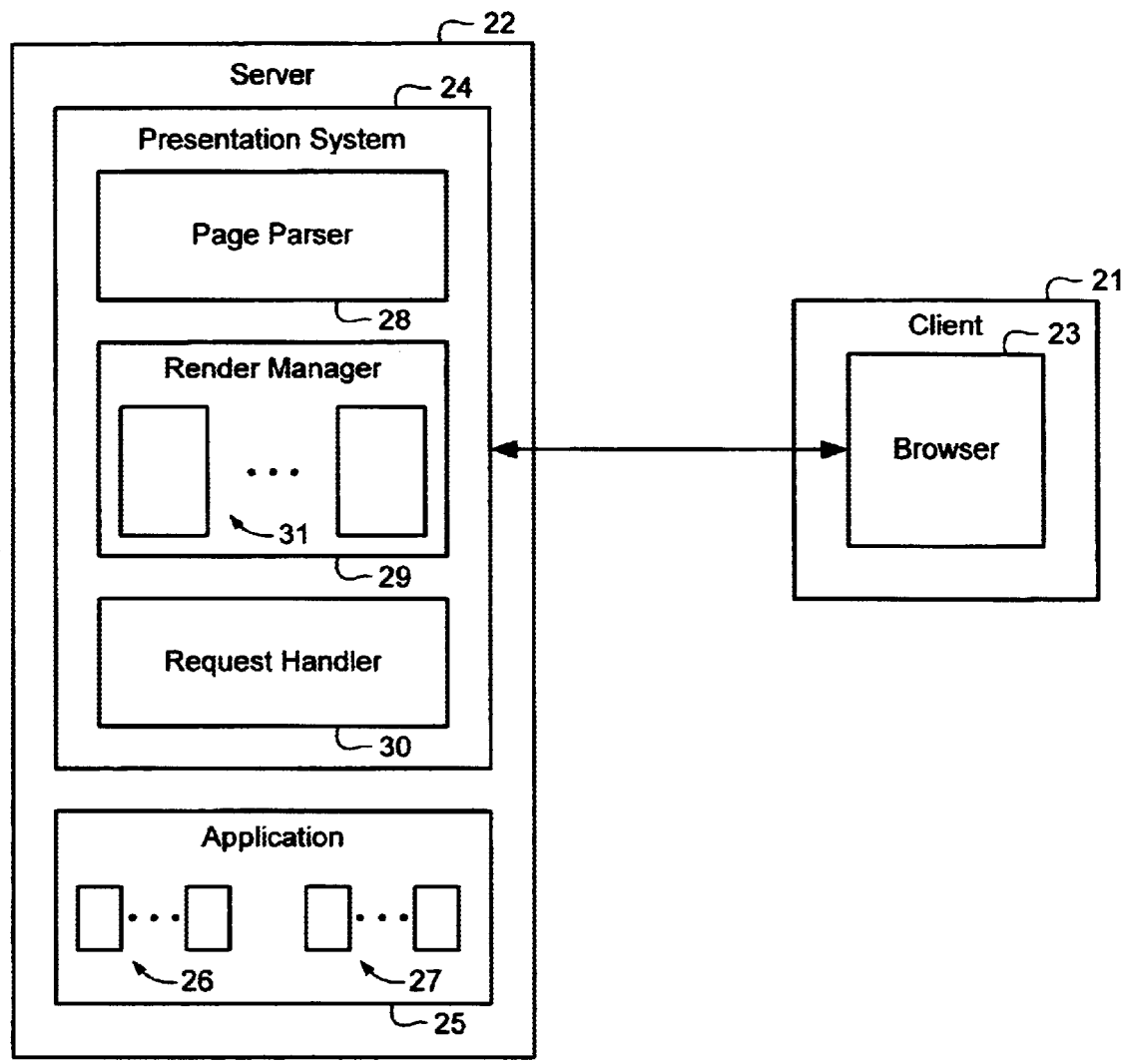
FIG. 3 is a block diagram of a server coupled to a client, in which the server maintained a set of render modules corresponding to multiple rendering modes.

FIG. 3 illustrates a presentation system for enabling a given software application to be executed in any of a plurality of render modes on a client on a network. The system is a server-based system that allows application information to be presented (rendered) in a format (mode) that is most suitable to the destination client. A key capability of the presentation system is its ability to use the same application definition, structure, and code logic regardless of the delivery mechanism. This allows applications to be created and deployed to a large number of diverse clients without modification or consideration of the end user's platform. End users can specify how they want information delivered to them when they make requests to the application server. This specification can alternatively be included in a user profile contained on the server, which is consulted in the absence of a user-specified format.

The system operates in a multi-tiered environment where clients, application servers, and original information sources can be placed on different physical computing devices and in different physical locations. The system addresses the problem of efficiently delivering application information from an application server tier to a client tier where the end user can view and/or interact with the information. Information is packaged in a format that is most suitable to the intended use and physical restrictions (such as bandwidth) requirements of the destination client.

Referring to FIG. 3, a software application 25 resides on a server 22 on a network, such as the Internet. The user of a remote client 21 on the network may wish to use the application 25. The application 25 is defined as a set of hypermedia (e.g., HTML) based pages 26 and an associated set of executable components 27, such as Java applets. One or more of the hypermedia pages 26 contain applet tags (e.g., "<APPLET>") referencing one or more of the executables components 27. The hypermedia pages 26 may be logically arranged in a hierarchy, as described above. The application 25 may also include various properties, parameters, etc., which may also be maintained in the server 22. Thus, in the context of this description, a software application is a set of hypermedia pages, logic, properties, data sets, and executable code, which together cause useful information to be delivered to an end user of a client system.

Note that the server 22 may actually be implemented as two or more separate servers, such as an HTTP server, an application server, a database server, etc. Such multiple servers may be implemented in two or more separate computer systems. As noted above, each such computer system may have a configuration as described above and shown in FIG. 2, as may the client 21.

When the user of the client 21 wishes to use the software application 25, he initiates an HTTP based request for one of the pages 26 using the browser 23, by clicking on a hypermedia link referencing one of the pages 26. This in general causes the requested hypermedia page 26 to be downloaded from the server 22 to the client 21, where the page is displayed to the user of the client 21 by the browser 23. In addition, any of the executable components 27 referenced in that page are invoked and executed.

The specific functions of the executable components 27 depend on the nature of the application 25 but may include, for example, charting or spreadsheet functions, grid or table generation functions, spelling or grammar is checking, various user interface functions, etc. The manner in which their output (e.g., charts, grids, tables, etc.) is presented to the user depends on the capabilities of the client 21 and/or the preferences of the user.

The presentation system 24 in the server 22 enables the output of the executable components 27 to be presented to the user of the client 21 in a manner which is best suited to the capabilities of the client 21. As described further below, the presentation system 24 includes a number of separate render modules 31, each for rendering output of an executable components 27 according to a different rendering mode, for a particular type of executable component.

In one embodiment, the application information delivery format is specified by a specific parameter in the Uniform Resource Locator (URL) used to request the information from the server 22. The URL parameter has the form "render=format", which appears after the standard World Wide Web Consortium (W3C) URL parameter delimiter, "?", e.g., "http://MyServer/MyApplication/?render=html" might be used to render output in standard HTML mode. A sophisticated user may manually add the render parameter to the URL prior to invoking a page 26. Alternatively, a given page 26 may provide the user with separate hypermedia links (and therefore separate URLs) for each selectable rendering mode, with the appropriate render parameter already included in each URL. The user may then select the desired rendering mode by selecting the corresponding link. In another embodiment, the render mode may be selected by providing the user with a page 26 that lists a variety of application and/or client system configuration options; the user may then select an option, and this selection corresponds to a URL that specifies the (predetermined) appropriate render mode for that option. In yet another embodiment, the render mode may be specified in a user profile for a particular user or client machine.

The acceptable values of the format field (acceptable render modes) are dependent on the implementation; however, in one embodiment the set of acceptable format values include, HTML, LINKS, JAVA, PRINTER, XML, and XLS. The HTML format value is used to render application information in a non-interactive, static W3C HTML format. This mode is used to view application information, but does not include mechanisms to interact with the information presented. The LINKS value is used to format the information in interactive W3C HTML. In this format, the application information presented is the same as the HTML format above, however, the end user is given the capability to interact with the information. Examples of such interaction include, but are not limited to "drilling down", pivoting, filtering, and moving On-Line Analytical Processing (OLAP) dimensions, changing colors and formats, and scrolling. In the interactive HTML case, the client 21 is caused to re-request the page 26. The server 22 responds to this interaction request by performing the appropriate operation (e.g., drill down, pivot, change chart to fit, etc.) and then causes the browser 23 to re-request the original page. Thus, the current state of the application 25 is modified by the interaction request, and the subsequent page request displays the newly modified state of the executable component.

When JAVA format is used, Java applets are sent to the client 21 which contain a higher level of LINKS functionality. In this format, the Java applets control all aspects of information display and interaction. A Java applet tag is inserted into the HTML page that causes these applets to be loaded onto the client 21. PRINTER format is used to format information in static W3C HTML suitable for output to a printer. XML format is used to format information in extensible mark-up language. When XLS format is used, the output information includes Multipurpose Internet Mail Extension (MIME) code that causes the browser 23 to launch a specific application and pass the static W3C HTML to that application. For example, the XLS format may be used to cause Microsoft Excel to be launched, such that the information is presented in the form of a standard Excel spreadsheet. Note that any valid MIME code may be used. The presentation system 24 is also extensible, such that new rendering modes can be added to provide the user with additional formatting options.

Referring again to FIG. 3, the presentation system 24 includes a page parser 28, a render manager 29, and a request handler 30. The request handler 30 is a conventional HTTP request handler which receives HTTP requests from the browser 23 and responds to those requests by accessing the requested pages 26 and executable components 27. The page parser identifies and removes certain predetermined elements from requested hypermedia pages in preparation for rendering, as described further below. These elements include Java applet tags corresponding to the executable components 27. The render manager maintains and invokes particular ones of the render modules 31, as appropriate for the specified rendering mode. The render manager 29 and the render modules may be implemented as Java classes. As noted, each of the render modules 31 is configured to render a particular type of executable component (e.g., grid, chart, etc.) in a particular render mode (HTML, LINKS, PRINTER, JAVA, etc.). In an alternative embodiment, however, Java rendering is handled separately, by the page parser 28, which includes a separate Java applet for that purpose.

Operation of the presentation system 24 is as follows. A given hypermedia page 26 of the application 25 may contain one or more tags referencing executable components 27 (e.g., Java applets), corresponding to areas in the page which will display application information (charts, grids, etc.). The application page is sent from the server 22 to the client 21 in response to URL requests from the client 21. The tags inform the server 22 which of executable components 27 to create and populate for the client 21 (i.e. the application information that will be sent to the client 21). For example, an application HTML page 26 in the server 22 may have an executable component for generating a chart and one for generating a grid. When the requested page is sent to the client 21, the corresponding regions within the requested page contain application information in the form of a chart and a grid. As application pages 26 are processed on the server 22, the presentation system 24 determines how each component should be formatted on the client 21 based on the render parameter of the URL or a default render format for the application and end user, as coded by the application's developer. This is done by invoking the appropriate one of the render modules 31 for each executable component associated with the page. Thus, the same application definition is used for multiple render modes.

Different rendering modes may be appropriate for different situations. For example, a user connecting to the server 22 using a slow-speed connection may request information to be formatted in the simplest format for viewing only HTML. A user who needs to perform in-depth analysis using the application 25 may request information to be presented using full-featured Java applets. A user who wants to print the application's information to a printer may use the PRINTER format to receive information that is "printer ready". Using the XML format, another application server which requires information that the application 25 contains can request self-describing information. Using the XLS format, application information can be loaded directly into a spreadsheet.

Figure 4:
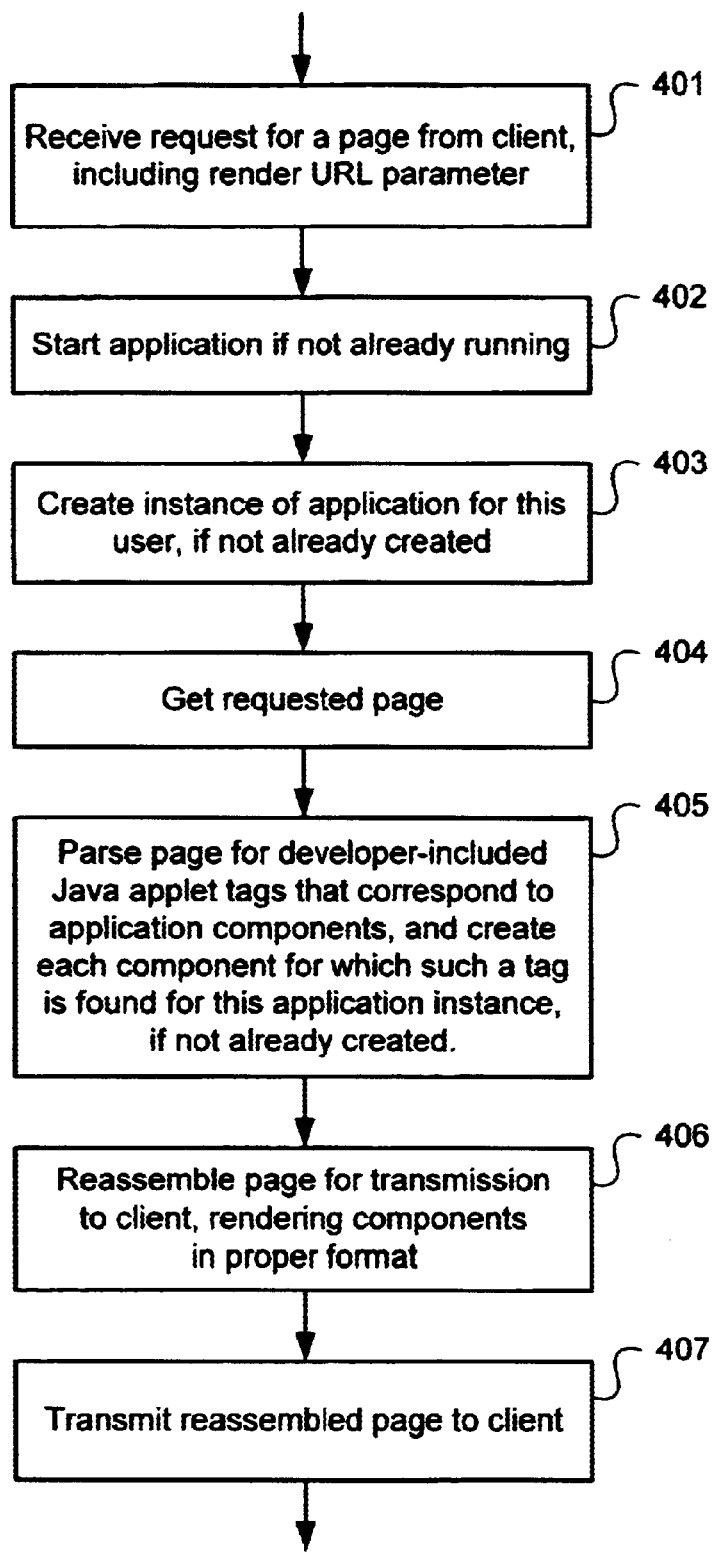
FIG. 4 is a flow diagram illustrating a server-implemented process for providing hypermedia documents to a client for a selected rendering mode.

Operation of the presentation system 24 will now be further described with reference to both FIG. 3 and FIG. 4. At block 401 in FIG. 4, the server 22 receives an HTTP request for one of the hypermedia pages 26 from the client 21. This request includes a URL with the render parameter that informs the presentation system 24 how the application information is to be presented. At block 402, the server 22 starts the application 25, if it is not already running. At block 403, the server 22 creates an instance of the application 25 for the current user, if one has not already been created. At block 404, the request handler 30 retrieves the requested page. At block 405, the page parser 28 parses the retrieves page for developer-included Java applet tags that correspond to the executable application components 27 (e.g., charts, grids, etc.). The component for each such tag is then created for this application instance, if it has not already been created. At block 406, the page is then reassembled for transmission to the client 21; this operation includes rendering the output of each such executable component 27 in the specified format, as described further below. The reassembled page is then transmitted to the client 21 at block 407.

Figure 5:
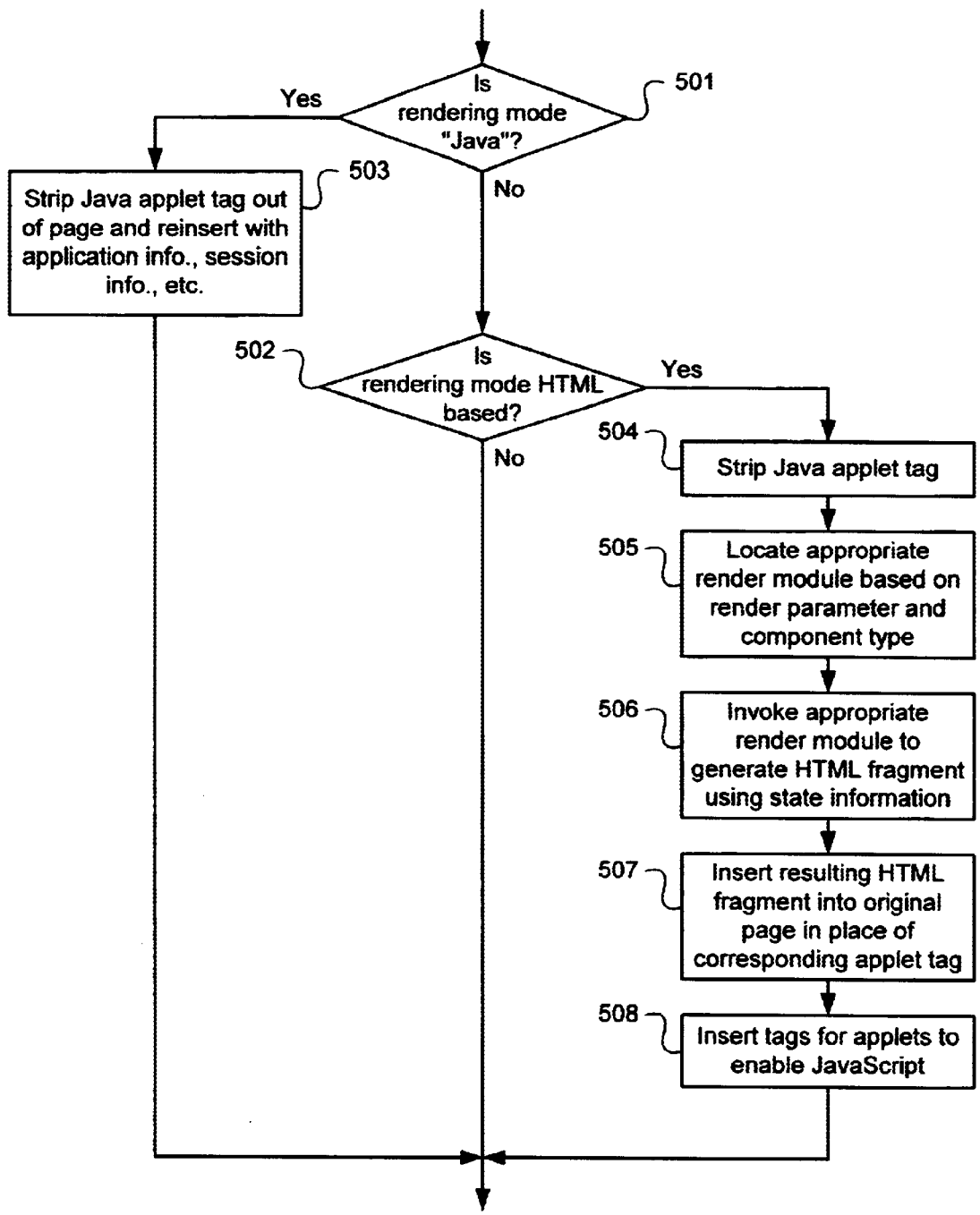
FIG. 5 is a flow diagram illustrating a server-implemented process for reassembling a hypermedia page for a selected render mode.

FIG. 5 illustrates in greater detail the reassembly and rendering block 406 (FIG. 4) for given executable component, with respect to the Java and HTML based rendering modes, for one embodiment. If the rendering mode specified for the executable component is JAVA at block 501, then at block 503, the page parser 28 strips the Java applet tag corresponding to the component out of the page and reinserts it with additional information, such as application information, session information, etc. (i.e., information which allows the Java applet to find the application created in block 402), and the process exits. Note that applet tags which do not correspond to any of the executable components 27 are simply buffered and sent back to the client 21 without modification in block 407. If the specified rendering mode is not JAVA, then it is determined at block 502 whether the rendering mode is HTML based, i.e., static HTML ("HTML") or interactive HTML ("LINKS"). If so, the process proceeds to blocks 504 through 508. Note that blocks 504 through 508 can also be applied for other, non-Java rendering modes; however, only HTML based modes are noted here to simplify description. At block 504, the page parser 28 strips the Java applet tag corresponding to the executable component out of the page. Again, applet tags which do not correspond to executable components 27 are simply buffered and sent back to the client 21 without modification in block 407. Next, at block 505, the render manager 29 locates the appropriate render module 31 based on the render parameter in the URL and the type of component that is being invoked. This is accomplished using a map maintained in the server 22 of executable components 27 to render modules 31. At block 506, the render manager 29 invokes the appropriate render module 31, which generates dynamically ("on-the-fly", in real-time) an HTML fragment, using information on the current state of the executable component. Each executable component 27 has a current state which may include, for example, data values, scroll position, colors, alerts, options, user properties, etc. The HTML fragment contains HTML code usable by the client 21 to render a visual representation of the component. In the case of interactive HTML (LINKS mode), the HTML fragment actually includes a combination of real-time generated JavaScript, HTML, and specially coded HTML links. From the user's perspective, these links are associated with normal HTML navigation methods, such as buttons, images, etc. At block 507, the resulting HTML fragment is inserted by the appropriate render module 31 into the original page in place of the applet tag that was stripped out. At block 508, the page parser 28 inserts additional applet tags that load very small applets maintained on the server, which are used to enable JavaScript on the browser 23 in the client 21; these additional applets are described further below.

As noted above, additional, very small applet tags are inserted into the page for the HTML based rendering modes, to enable JavaScript on the client 21. The application environment described above is based on the ability of application developers/assemblers to code their business and navigation logic in JavaScript. The JavaScript is contained in the hypermedia pages 26 that the server 22 sends to the client 21. In order for this developer-provided JavaScript to function, it must communicate back to the server 22 to request information, change states, and control server functions. The JavaScript normally does this by using Application Programming Interfaces (APIs) supplied by the Java client associated with server 22. These APIs may be simply Java methods that are exposed on each of the executable components 27. In order for this client side code to operate in all rendering modes, these APIs must be made available.

In the Java rendering mode, the same Java applets that present information to the user contain these JavaScript APIs. For example, a Java applet representing a charting component displays charts and also exposes the charting APIs to JavaScript. In the HTML rendering mode, however, Java is not used to display information to the client. Instead, the client browser 23 receives pure HTML representations of charts (e.g., JPEG) and data grids. Thus, a mechanism is needed to allow the developer-provided JavaScript code to operate.

Consequently, when an HTML-based rendering mode is selected, the server 22 strips out the Java applet tags (corresponding to executable components 27) from the HTML source page and replaces them with tags for alternate, very small Java applets, which reside on the server 22. These small Java applets contain only a version of the above-mentioned APIs. They do not present information to the user and they are not visible on the screen. The developer's JavaScript is ignorant of the fact that it is communicating with these alternate applets. Thus, an application 25 operates the same in both Java and HTML based rendering modes on the client 21.

Note that switching to these alternate Java applets for HTML based rendering modes also reduces the amount of code and the resulting startup time for the application 25. Where a full Java applet complete with API and presentation information can be on the order of several megabytes in size (with all necessary supporting technologies), these alternate Java applets tend to be on the order of tens of kilobytes. This is major difference in size, as well as download time and complexity. Hence, download time for these alternative applets is insignificant.

Thus, a method and apparatus for enabling software to be presented in any of a plurality of render modes in a client system on a network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of enabling software to be presented in any of a plurality of render modes, the method comprising:

maintaining, in a server system on a network, a logic definition of a software application, the logic definition for use with each of a plurality of selectable render modes for presenting the software application on a client system on the network;

selecting one of the plurality of render modes in the server system based on, and in response to, a signal from the client system; and using the logic definition to cause output of the software to be rendered to the client system in the selected render mode, wherein the server system maintains a plurality of render modules, each of the render modules corresponding to a particular one of the render modes, and said using includes:

operating one of the render modules corresponding to the selected render mode to generate information to enable the client system to render the software application in the selected render mode, retrieving a hypermedia page specified by the signal from the client system, in response to the signal from the client system, identifying tags in the hypermedia page which identify predetermined executable software components, removing from the hypermedia page the tags which identify the predetermined executable software components, and inserting into the hypermedia page information for enabling the client system to render the software application in the selected render mode in place of said tags.

2. A method as recited in claim 1, wherein said information comprises a markup language fragment, wherein said executing comprises using the selected render module to generate the markup language fragment dynamically in response to the signal from the client system, based on current state information.

3. A method of enabling software to be executed in any of a plurality of render modes, the method comprising:

maintaining a plurality of render modules in the server system, each of the render modules corresponding to a different one of a plurality of render modes for presenting output of the software on a client system on the network;

selecting one of the render modes in response to a signal from the client system; and using a single logic definition of the software and one of the render modules corresponding to the selected render mode to provide information to the client system, to enable the client system to present output of the software to a user in an appropriate render mode, wherein said using further includes:

retrieving a hypermedia page specified by the signal in response to the signal;

identifying applet tags included in the hypermedia page which identify predetermined executable software components;

removing from the hypermedia page the applet tags which identify predetermined executable software components; and inserting into the hypermedia page said information to enable the client system to render the software application in the appropriate render.

4. A method as recited in claim 3, wherein said information comprises a markup language fragment, wherein said executing comprises using the selected render module to generate the markup language fragment dynamically in response to the signal from the client system, based on current state information.

5. A method of enabling a software application to be presented to a user in any of a plurality of render modes, the method comprising:

maintaining a plurality of render modules on a server processing system, each of the render modules corresponding to a different one of a plurality of render modes for presenting the software application on a remote client processing system, the plurality of render modes including an interactive render mode and a non-interactive render mode, all of the plurality of render modules for use with a single application definition of the software application;

receiving a signal from the client processing system, the signal representing selection of a hyperlink by a user of the client processing system;

selecting one of the render modules based on the signal;

executing the selected one of the render modules to provide information to the client processing system tailored for a particular render mode, the information for use by the client to enable the client to present the software application in the render mode corresponding to the selected one of the render modules;

retrieving a hypermedia page specified by the signal in response to the signal;

parsing the hypermedia page to identify any applet tags included therein which correspond to executable software components;

removing said applet tags corresponding to executable software components from the hypermedia page; and inserting into the hypermedia page said information tailored for the particular render mode in place of said applet tags.

6. A method as recited in claim 5, wherein said information tailored for the particular render mode comprises a markup language fragment, wherein said executing comprises using the selected render module to generate the markup language fragment dynamically in response to the signal from the client system, based on current state information.

7. An apparatus for enabling software to be executed in any of a plurality of render modes, the apparatus comprising:

a logic definition of the software adapted for use with any of a plurality of render modes of the software;

means for selecting one of the plurality of render modes for presenting output of the software based on, and in response to, a request to execute the software from a client system on a network;

means for causing the output of the software to be rendered to the client system, using said logic definition, in the selected render mode in response to the request, wherein said means for causing includes:

means for retrieving a hypermedia page specified by the request in response to the request;

means for identifying applet tags included in the hypermedia page which identify predetermined executable software components;

means for removing from the hypermedia page the applet tags which identify predetermined executable software components; and means for inserting into the hypermedia page said information to enable the client system to render the software application in the appropriate render.

8. An apparatus as recited in claim 7, wherein said information comprises a markup language fragment, wherein said executing comprises means for using the selected render module to generate the markup language fragment dynamically in response to the request from the client system, based on current state information.

9. An apparatus as recited in claim 7, wherein the signal received from the client is in response to, and representative of, a selection of a hyperlink by a user of the client.

10. An apparatus as recited in claim 9, wherein the signal received from the client corresponds to a Uniform Resource Locator (URL).

11. An apparatus as recited in claim 7, wherein a content of the signal received from the client is based on a prior selection, in the client, of one of a plurality of selectable render mode options.

12. An apparatus as recited in claim 11, wherein the prior selection in the client is made by a user of the client using a graphical user interface.

13. An apparatus as recited in claim 7, wherein the plurality of render modes comprises an interactive render mode and a non-interactive render mode.

14. An apparatus as recited in claim 12, wherein the plurality of render modes comprises an interactive Hypertext Mark-up Language (HTML) based render mode and the non-interactive mode comprises a non-interactive HTML based render mode.

15. An apparatus as recited in claim 7, wherein the plurality of render modes comprises a Hypertext Mark-up Language (HTML) based render mode.

16. An apparatus as recited in claim 7, wherein the plurality of render modes comprises an extensible Mark-up Language (XML) based render mode.

17. An apparatus as recited in claim 16, wherein the plurality of render modes further comprises a Hypertext Mark-up Language (HTML) based render mode in addition to the XML based render mode.

18. A method as recited in claim 7, wherein the plurality of render modes comprises a Java based render mode.

19. A server system comprising:
   a processor;
   a network interface coupled to the processor and providing the server system with an interface to a network;
   a plurality of render modules, each of the render modules corresponding to a different one of a plurality of render modes for presenting a software application on a remote client processing system on the network, the plurality of render modes including an interactive render mode and a non-interactive render mode;
   a first storage facility coupled to the processor and storing a definition of the software application; and
   a second storage facility coupled to the processor and storing instructions which, when executed by the processor, cause the server system to:
      select one of the render modules based on a signal received from the remote client processing system, the signal in response to, and representative of, a selection of a hyperlink by a user of the remote client processing system, the selection of the hyperlink representing a request to execute said software,
      invoke the selected render module in conjunction with the definition of the software application, such that information tailored for a particular render mode is provided to the remote client processing system based on the selection, the information for use by the remote client processing system to enable the client to present the software application in the particular render mode,
      retrieve a hypermedia page specified by the signal in response to the signal,
      identify tags included in the hypermedia page which identify predetermined executable software components,
      remove from the hypermedia page the tags which identify predetermined executable software components, and
      insert into the hypermedia page said information to enable the client system to render the software application in the appropriate render.

20. A server system as recited in claim 19, wherein said information comprises a markup language fragment, wherein said executing comprises using the selected render module to generate the markup language fragment dynamically in response to the signal from the client system, based on current state information.

21. A server system as recited in claim 20, wherein the plurality of render modes comprises an interactive Hypertext Mark-up Language (HTML) based render mode and the non-interactive mode comprises a non-interactive HTML based render mode.

\* \* \* \* \*

UNITED STATES PATENT AND TRADEMARK OFFICE
CERTIFICATE OF CORRECTION

PATENT NO. : 6,665,860 B1
DATED : December 16, 2003
INVENTOR(S) : Robert P. DeSantis et al.

It is certified that error appears in the above-identified patent and that said Letters Patent is hereby corrected as shown below:

<u>Title page, Item [54] and Column 1, line 1,</u>
Title, please delete "SEVER-BASED" and insert -- SERVER-BASED --

<u>Column 11,</u>
Line 20, please delete "12" and insert -- 13 --.

Signed and Sealed this

Sixth Day of April, 2004

JON W. DUDAS
*Acting Director of the United States Patent and Trademark Office*